United States Patent
Fontaine

(10) Patent No.: US 6,801,306 B2
(45) Date of Patent: Oct. 5, 2004

(54) STREAK CAMERA SYSTEM FOR MEASURING FIBER BANDWIDTH AND DIFFERENTIAL MODE DELAY

(75) Inventor: Norman H. Fontaine, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 393 days.

(21) Appl. No.: 10/057,636

(22) Filed: Jan. 24, 2002

(65) Prior Publication Data
US 2002/0176071 A1 Nov. 28, 2002

Related U.S. Application Data
(60) Provisional application No. 60/281,543, filed on Apr. 4, 2001.

(51) Int. Cl.[7] ............................................... G01N 21/00
(52) U.S. Cl. ..................................................... 356/73.1
(58) Field of Search ..................... 356/73.1; 385/12–16, 385/147, 100; 350/227.11, 227.17, 227.15

(56) References Cited

U.S. PATENT DOCUMENTS 4,984,884 A * 1/1991 Ryu et al. ................... 356/73.1
5,969,806 A * 10/1999 Bergano ..................... 356/73.1
6,381,010 B1 * 4/2002 Piffaretti ..................... 356/73.1
6,687,426 B1 * 2/2004 May et al. ..................... 385/15

* cited by examiner

Primary Examiner—Tu T. Nguyen
(74) Attorney, Agent, or Firm—William J. Chervenak; Kevin M. Able

(57) ABSTRACT

A method and apparatus for measuring the pulse width of a narrow optical pulse, particularly in a multi-mode optical fiber. A spectrograph and streak camera are combined to record optical intensity data in a 2-dimensional array resolving both wavelength and temporal dependence of the optical pulse. The data is analyzed to calculate the chromatic dispersion and then to remove it. For example, the data in different wavelength windows are time shifted relative to each other by the amount of the chromatic dispersion so that all windows have approximately the same temporal dependence. The correction may numerically establish time offsets producing the maximum cross-correlation between wavelength windows. The corrected data may then be summed over optical wavelength, and the corrected time-dependent data is further analyzed to establish optical pulse width and impulse response of the fiber. Thereby, a laser diode with relatively large spectral width can characterize a high-bandwidth fiber.

10 Claims, 7 Drawing Sheets

STREAK CAMERA SYSTEM FOR MEASURING FIBER BANDWIDTH AND DIFFERENTIAL MODE DELAY

This application claims the benefit of and priority to U.S. Provisional Application No. 60/281,543, filed Apr. 4, 2001.

FIELD OF THE INVENTION

The invention relates generally to optical measurements. In particular, the invention relates to methods and instrumentation for characterizing pulse broadening in optical fibers.

BACKGROUND ART

The signal capacity of an optical fiber communication system is limited by several fundamental effects, many of which involve the broadening of an optical pulse as it traverses a fiber from the transmitting to the receiving end. Most optical signals have a finite spectral width, that is, range of wavelengths constituting the optical pulse, and the speed of propagation on a fiber varies with wavelength. The wavelength dependence of the speed of light on a fiber is referred to as chromatic dispersion although intra-modal dispersion is a more accurate term. Intra-modal dispersion includes material dispersion and waveguide dispersion. Material dispersion is caused by the variation with wavelength of the optical constants of the materials constituting the optical fiber, particularly its core. Waveguide dispersion arises from the variation with wavelength of the optical fields associated with the waveguide geometry. For example, the diameter of the field and the numerical aperture of any waveguide mode varies with the mode's wavelength. Material and waveguide dispersion are present in both single-mode and multi-mode fiber.

Although single-mode optical fiber is predominantly used in long-haul communication networks, multi-mode optical fiber offers several advantages when installed in short-haul systems. The larger core is easier to align, which is important for installing local area networks (LANs), which require a large number of fiber connections to be made. Also, multi-mode fiber is compatible with the less expensive detectors such as vertical cavity surface emitting lasers (VCSELs) that emit in the 850 nm band of silica fiber.

A multi-mode fiber is distinguished by its ability to convey (propagate) at least two optical modes while a single-mode fiber can propagate only a single fundamental mode at any wavelength. Degenerate or nearly degenerate polarization modes, the latter of which produce polarization mode dispersion (PMD), will not be considered here. Multi-mode fiber is subject additionally to inter-modal dispersion in which the different modes even of the same optical wavelength propagate at different speeds. Inter-modal dispersion is usually referred to as differential mode delay (DMD).

The manufacture of high capacity optical fiber requires frequent monitoring in the production plant of the bandwidth and differential mode delay to assure that manufacturing and material variations do not unduly limit the fiber bandwidth. The bandwidth (BW) is used to determine the maximum rate of communication, usually stated in gigabits per second (Gbs) or gigahertz (GHz) for a given length of fiber that a given combination of fiber, fiber length, and laser can transfer to a receiver without significant error. For the fiber manufacturer, the relevant BW value is that associated with the impulse response of the fiber itself and is more generally expressed for any length of fiber in units of Gbs×km. The performance of multi-mode fiber communication systems is often limited by DMD. From DMD measurements of the multi-mode fiber, the bandwidth performance of a particular laser-fiber combination can be predicted. Also, the results from DMD measurements can used to tune the process for creating the fiber preforms such that the drawn fiber will have a maximal bandwidth for use with lasers of various types and characteristics.

However, the presence of significant intra-modal dispersion on a multi-mode fiber, for example, a contribution of more than 10% to the pulse broadening, will interfere with the accurate measurement of DMD or BW determined by inter-modal dispersion. Heretofore, fiber measurement method for time-resolved pulses have not simultaneously measured and corrected the effects of intra-modal dispersion.

A further complication arises from the limitations of pulsed laser sources. The more economical laser diodes have a small but significant spectral width on the order of a few nanometers. The large spectral width of the source is multiplied by the intra-modal dispersion of the fiber in determining the chromatically widened pulse width at the receiving end of the fiber. Furthermore, a pulsed diode laser may be subject to significant chirp in which the spectral content of the pulse changes over the short pulse. The effects of chirp are similar to the pulse broadening of intra-modal dispersion, but chirp occurs prior to the signal being launched on the fiber.

Conventionally, DMD and BW measurements have been performed by impressing a short optical pulse on one end of a long test fiber and measuring the intensity $I(t)$ of the pulse at the other end as a function of time. For bandwidth measurements, a Fourier transform $I(\omega)$ of the time profile is compared to the Fourier transform $I_{ref}(\omega)$ of the input pulse, usually measured over a short reference fiber. The deconvolution in frequency space of the test pulse and the reference pulse $I(\omega)$ and $I_{ref}(\omega)$ allows the BW to be computed, as per *FOTP-51: Pulse Distortion Measurement of Multimode Glass Optical Fiber Information Transmission Capacity*, Electronic Industries Association, EIA/TIA-455-51A, May 1991. The impulse response of the test fiber is the deconvolution, that is, the inverse Fourier transform.

In the past, in the absence of separate consideration of the intra-modal dispersion, four competing requirements have been imposed on the optical pulse that is launched from a laser into the fiber to be tested in order to minimize intra-modal dispersion and other chromatic effects:

(1) a narrow spectral width is required to minimize the error arising from chromatic dispersion arising in the test fiber, which would influence the BW and DMD measurements;

(2) a very short pulse length, typically 50 to 100 ps;

(3) high pulse power required to measure long lengths of fiber and provide a large dynamic range in the measurements; and (4) low or no chirp in the pulsed laser source.

These requirements attempt to provide an optical source pulse that approaches a delta function in time.

If a laser diode is used for the light source, optimizing any one of the four criteria will, in general, degrade the laser diode's performance in the other three criteria. The problem becomes acute with 10 Gbs fibers for which pulsed edge-emitting laser diodes no longer can satisfy all three requirements. In particular, measurement errors arising from intra-modal dispersion become significant with ordinarily available diode lasers. Furthermore, the emission spectra of diode lasers tend to be somewhat wide, particularly in the pulsed mode of operation. For multi-mode fibers being developed for 10 Gbs operation, chromatic dispersion arising from the spectral width Δλ for laser diodes of 3 to 6 nm at FWHM accounts for a major fraction of the total pulse spreading in the fiber. As the fiber BW increases, the large intra-modal dispersion leads to a increasingly greater fraction of the error in measuring BW and DMD in the fiber.

The distinct contributions of intra-modal dispersion and differential mode delay are emphasized by differences in operational conditions between factory and field. In the common usage of multi-mode fiber for local area networks, typical maximum lengths are in the range of 300 to 600 m representing a run within a building or between buildings on a campus. Over such lengths, loss is not a significant problem so that low-power laser sources can be used. The characteristics of a vertical-cavity surface-emitting laser (VCSEL) are matched to these conditions. A VCSEL produces a low-power optical pulse with a very small spectral width of about 1 nm or less. Its beam width of between about 10 to 25 $\mu$m is easily coupled into a 50 $\mu$m multi-mode core. The very small spectral width of the VCSEL source means that intra-modal dispersion is not a significant problem, particularly over the relatively short transmission lengths. In contrast, the factory producing such multi-mode fiber typically winds the fiber in spools of length between 1 and 10 km for shipment and sale. It is greatly desired that factory testing be performed on fiber having such lengths instead of cutting a shorter length or interrupting production. However, multi-mode fiber having a length of greater than 1 km does suffer significant optical absorption and power loss, which increase exponentially with length. Accordingly, a more intense laser source such as a diode laser is needed for such factory testing. However, as mentioned previously, laser diodes have significant spectral widths, typically in the range of 3 to 6 nm for 850 nm laser diodes. As a result, chromatic dispersion significantly contributes to temporal broadening in factory testing even though in the field it tends to not be that important.

Other laser sources are available providing narrow spectral widths and narrow pulses and allow accurate BW and DMD measurements on long fiber lengths, for example, a mode-locked Ti:sapphire laser. Such a laser not only is expensive, but more importantly is a type of laser that may require special eye protections which are difficult to implement in a production environment. However, production line measurements are greatly desired for the high bandwidth multi-mode fiber in order to closely monitor the fiber to be offered for sale.

SUMMARY OF THE INVENTION

The invention includes a method of measuring the pulse broadening and other temporal and chromatic characteristics of an optical pulse. The pulse is separated both in time and optical wavelength, and the time- and wavelength-dependent components are recorded.

In one aspect of the invention, the data is then analyzed to chromatically correct it, particularly to reduce or remove the wavelength dependence.

One method of chromatically correcting the data includes calculating the temporal cross-correlation functions between data of different wavelength windows. The temporal offset producing the largest cross-correlation is used to correct the data of that wavelength by time shifting the data by that amount. Further, the multiple temporal offsets producing the largest cross-correlations can be fit to a line, the slope of which measures the intra-modal dispersion.

The corrected pulses may be integrated over wavelength to produces a time-resolved pulse with an improved signal-to-noise ratio.

The corrected data may be used to characterize the optical transmission medium, for example, to establish the differential mode delay of a multi-mode fiber. The invention is particularly useful for monitoring the production of multi-mode fiber.

In another aspect of the invention, the data is analyzed to separate the temporal and chromatic portions of the fiber-broadening of the optical pulse and other types of chromatic and temporal characterization of optical pulses. For example, the inter-modal broadening on a multi-mode fiber may be separated from the intra-modal broadening, and the fiber characteristics may be separated from the characteristics of the pulsed laser source.

A further aspect of the invention includes measuring and compensating for chirp in a laser used to characterize a fiber.

The invention also includes the apparatus for acquiring and analyzing the optical data. The apparatus may include a combination of a spectrograph, a streak camera, and a computer programmed to analyze the acquired data.

DETAILED DESCRIPTION OF THE PREFERRED EMBODIMENTS

One embodiment of the invention compensates for chromatic dispersion by recording the time-wavelength intensity profile I(t, λ) for one or more pulses and then analyzing the data to remove the intra-modal dispersion. This embodiment allows the calculation of a substantially wavelength-independent time intensity profile I(t) or related spectra.

Figure 1:
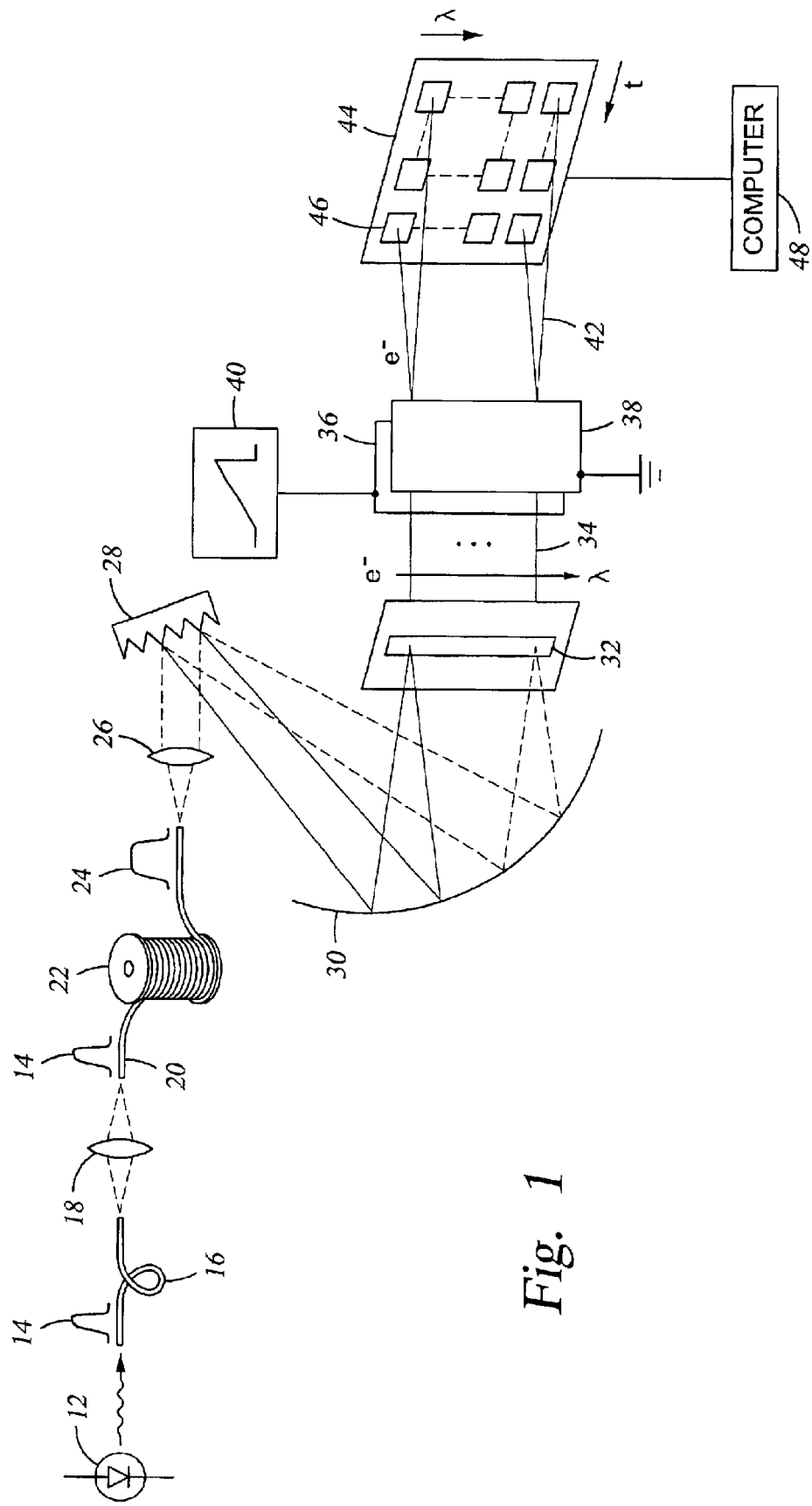
FIG. 1 is a schematic and conceptual representation of an embodiment of the apparatus of the invention.

In one implementation, a streak camera and spectrograph are used to chromatically and temporally resolve the reference and test pulses. A schematic representation of the functional parts of the apparatus are illustrated in FIG. 1. A source of pulsed laser light, for example, an edge-emitting laser diode 12 outputs an optical pulse 14 which has a short but finite pulse width and a narrow but finite spectral width. The optical pulse 14 is coupled into a launch fiber 16, which may be single-mode or multi-mode or be substituted by optics or free-space coupling. Optics 18 couple the light from the launch fiber 16 onto a fiber under test 20. If the fiber under test 20 is a production fiber, it is typically wound on a spool 22 in a length of more than a kilometer. If the fiber under test 20 is a reference fiber used to calibrate the system in some aspects of the method of the invention, it has a much shorter length, preferably less than 10 m, for example, approximately 2 m. As a result, the production fiber is typically at least 100 times longer than the reference fiber. In an important application of the invention, the fiber under test 20, whether a production or a reference fiber, is a multi-mode fiber capable of propagating both the fundamental mode and at least one higher-order mode at the wavelength of the pulsed light source 12. Due to both differential mode delay (DMD) and intra-modal dispersion, the pulse width of a light pulse 24 exiting the long test fiber 20 is considerably broader than the input pulse 14.

Optics 26 collimate and match the numerical aperture of the light output from the fiber under test 20 onto an imaging spectrograph or other wavelength dispersive element including, for example, a diffraction grating 28, which receives the output pulse 24 and angularly separates its wavelength components. In one type of an imaging spectrograph, a focusing reflector 30 reimages the light onto a long, narrow photocathode 32, but with the optical wavelength components spaced along the long dimensions of the photocathode 32. The photocathode 32 may have effective dimensions of 150 $\mu$m×5 mm. An extraction grid system including a slit uniformly accelerates the photoelectrons produced by the light striking the photocathode 32 to produce a line beam 34 of electrons. The positions along the line of the electron beam 34 correspond to the optical wavelength components in the optical pulse 24, and the number of electrons at any position corresponds to the intensity (number of photons) of that wavelength component in the optical pulse 24.

The electron line beam 34 is passed between a pair of electrostatic deflection or sweep plates 36, 38 disposed across the short dimension of the line beam 34. A plate driver 40 applies a ramp signal across the plates 36, 38, which is synchronized with the optical pulse 24 and has a collection period that is somewhat longer than the pulse width of the output pulse 24. The sweeping produces a two-dimensional electron beam 42 that varies in optical wavelength in one dimension and with time in the other. This beam 42 strikes an electron detector array, such as a CCD (charge coupled device) 44. Each pixel 46 of the 2-dimensional CCD array 44 is identified with an optical wavelength and with a time during the optical pulse. The quantity of charge collected in that pixel 46 corresponds to the intensity of the optical wavelength at that time during the optical pulse.

In normal operation for fiber testing, the streak camera collects a large number of optical pulses before the data is read out. For example, the diode laser 12 may be repetitively pulsed at a repetition rate of up to 2 MHz over a collection period of the order of milliseconds to seconds. During the entire collection period, the CCD pixels 46 are collecting charges and integrating them over the multiple pulses. Only at the end of the collection period are the integrated charges read from the pixels 46. After data collection, a computer 48 reads all the pixels and processes the data, for example, as will be described below. In order to improve signal to noise, more than one set of data can be collected in series and then averaged.

The above description is illustrative and other forms of a streak camera and wavelength separation are possible. Portions of the apparatus of FIG. 1, however, are commercially available and may be incorporated into a more realistic measurement system illustrated in FIG. 2 set up for DMD measurements. The optics 18 receive the optical input pulse launched from the launch fiber 16 and focuses it onto the input end of the fiber under test 20. A movable XYZ stage 54 supports the input end of the fiber under test 20 to allow tuning to maximize coupling.

The output end of the fiber under test 20 is joined through a multi-mode buffer fiber 56 to another multi-mode fiber 58 connected to a numerical aperture matcher 60 which matches the numerical aperture of the fiber 58 to that of an imaging spectrograph 62. The buffer fiber 56 is spliced to the fiber under test 20 and cut from it after the testing. After multiple uses, it becomes too short and is discarded and replaced.

The spectrally separated optical output of the imaging spectrograph 62 is coupled to a streak camera 64, which may include the photocathode 32, deflection plates 36, 38 and CCD 44 of FIG. 1. One such streak camera 64 is commercially available as Streakscope Model C4334 from Hamamatsu Photonics Deutschland GmbH of Herrsching, Germany. A computer controller 66 controls the streak camera 64 and reads the output of the camera's CCD array after the data have been acquired. The computer controller 66 includes a frame grabber for capturing the CCD images at about 30 ms intervals. An electrical delay generator 68 triggers the streak camera 64 and synchronizes the pulsing of the laser diode 12 through a diode pulse driver 70.

The output of the CCD of the streak camera is read by the computer controller 66 after the acquisition of a large number of optical pulses. The computer controller 66 can be any computer adapted for instrumentation control, but the computer controller for the streak camera can be used for performing the data analysis to be described below, in which case the optical intensity data is stored in a data memory 72 and the analysis software is stored in a programming memory 74 associated with the computer controller 66. On the other hand, the data collected by the computer controller 66 in the data storage 72 may be read out and analyzed in another, general purpose computer. Unillustrated input/output devices allow the programming of the computerized system and the readout of the final results.

The operation of the invention will be described with respect to experimental data acquired in a system using a laser diode for the optical source producing a relatively short pulse having a pulse width of about 80 ps but with a relatively wide spectral width of 3 to 6 nm centered at about 858 nm. This band is in the middle of a useful transmission band in multi-mode silica fiber. FIG. 3 illustrates a set of optical iso-intensity contours I($\lambda$, t) as a function of wavelength and time for such a pulse after it has traveled over a long multi-mode fiber and then measured by the apparatus of FIG. 2. The contours are derived from experimental data and are much rougher than illustrated. The contours show significant intensity for a pulse width of about 2.4 ns for any one wavelength and over a spectral width of about 6 nm. However, chromatic dispersion introduces a fairly uniformly varying skew of almost 2 ns over the spectral width.

Figure 3:
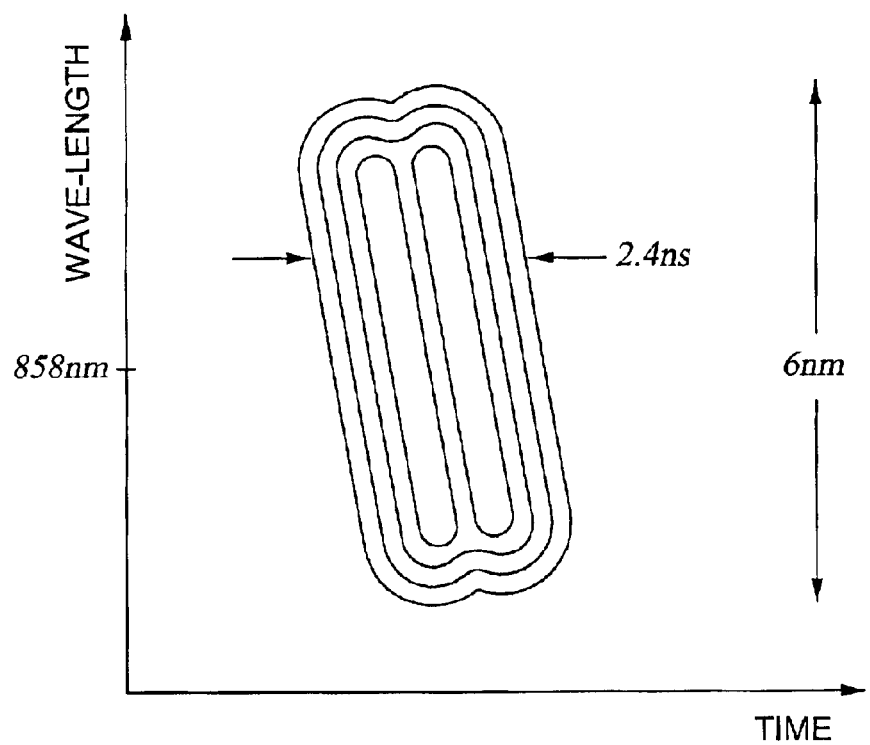
FIG. 3 is a plot of iso-intensity contours as a function of time and wavelength for an optical pulse manifesting both intra-modal and inter-modal dispersion.
Figure 4:
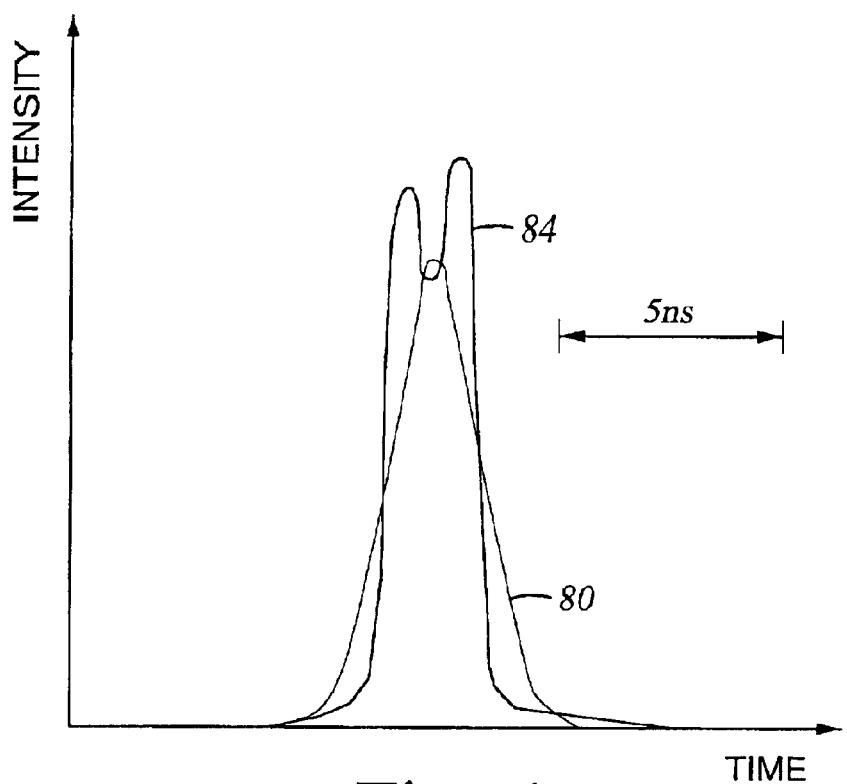
FIG. 4 illustrate optical pulse wave forms corresponding to the data of FIG. 3.

If these data are numerically manipulated to mimic a time-domain measurement of non-spectrally resolved data, that is, the intensity data are integrated along the wavelength axis, a time-resolved pulse shape 80 illustrated in FIG. 4 is obtained. The pulse shape 80 is spread by both differential mode delay and intra-modal (chromatic) dispersion. The invention permits both the measurement and the removal of intra-modal dispersion. The effect of removing the intra-modal dispersion will be to adjust the data of FIG. 3 so that the iso-intensity contours are vertically arranged.

In a method according to the invention, the data represented by FIG. 3 are analyzed according to wavelength windows, each window being characterized by a center wavelength $\lambda_n$ and with a wavelength span $\Delta\lambda$ corresponding to a wavelength dispersion over one CCD pixel or an integral multiple thereof, the latter of which produces a signal averaged over a set of multiple pixels. Let the data for each window for wavelength $\lambda_n$ be defined as $$I_n(t) = \int_{-\Delta\lambda/2}^{+\Delta\lambda/2} I(\lambda_n + \Lambda, t) d\Lambda, \quad (1)$$

which includes an integration over the wavelength span $\Delta\lambda$ identified to each pixel or pixel set of the CCD array. One of the wavelength windows, possibly the center one or the one having the largest total intensity, is chosen as the reference window. The cross-correlation function is calculated between each window and the reference window $$C_n(\tau) = \int I_n(t) I_{ref}(\tau + t) dt. \quad (2)$$

Of course, in the computation the intensity data are summed over the time-resolved bins produced by the CCD array rather than analytically integrated. The time offset $\tau_{n,m}$ producing the maximum cross-correlation for the n-th wavelength window is chosen as the amount to correct the data for that window.

$$I_{n,CORR}(t) = I_n(t - \tau_{n,m}). \quad (3)$$

The cross-correlation functions obtained from the data of FIG. 3 are smoothly peaked, though with a variable offset from zero of both positive and negative values.

The cross-correlation calculation can be numerically performed much more quickly by first calculating the Fourier transforms $$I_n(\omega) = \int I_n(t) e^{i\omega t} dt \quad (4)$$

for each window, multiplying them by the transform for the reference window to obtain the transforms of the cross-correlation functions, and then inverse transforming the cross-correlation transforms to obtain the time-dependent cross-correlation functions $C_n(\tau)$.

Figure 5:
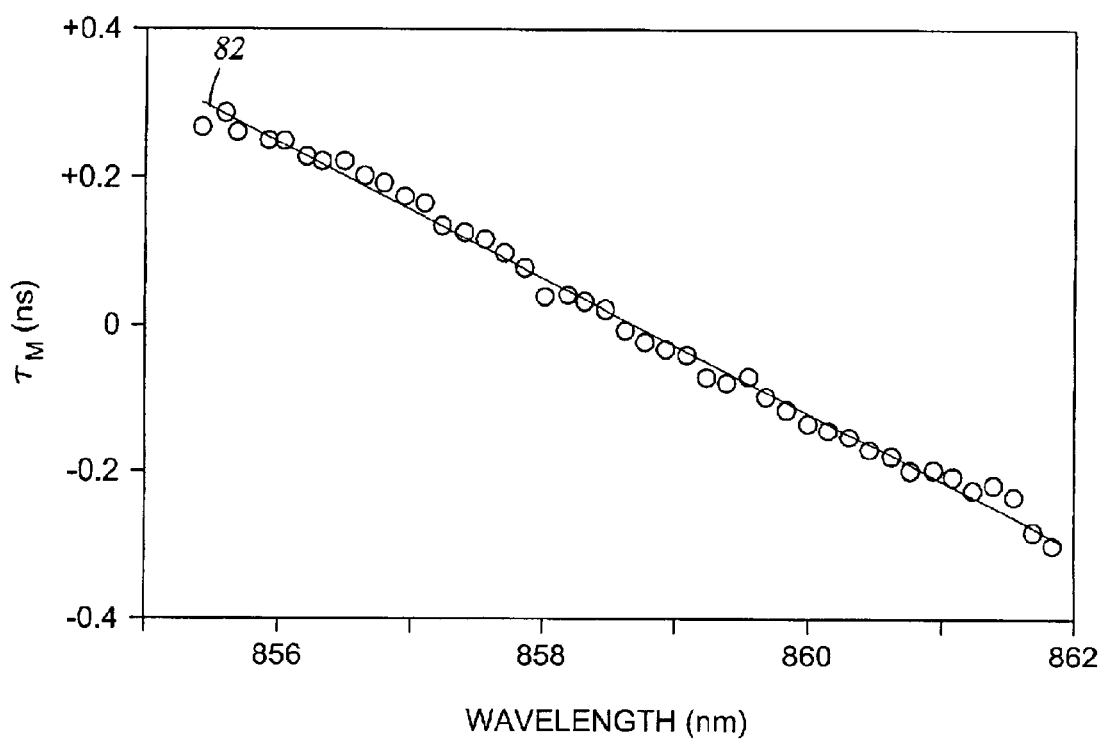
FIG. 5 is a plot of time differences between wavelength windows of the data of FIG. 3 producing maximum cross-correlation.

The graph of FIG. 5 plots the offsets $\tau_{n,m}$ producing the maximum cross-correlation functions as a function of optical wavelength for the data of FIG. 3. It is preferred that the linear fit to these offsets, represented by line 82, be used to calculate the time correction for each of the wavelength windows. The slope of the line represents the total intra-modal (chromatic) dispersion, in this case −91 ps/(km.nm), when normalized to the length of fiber.

Figure 6:
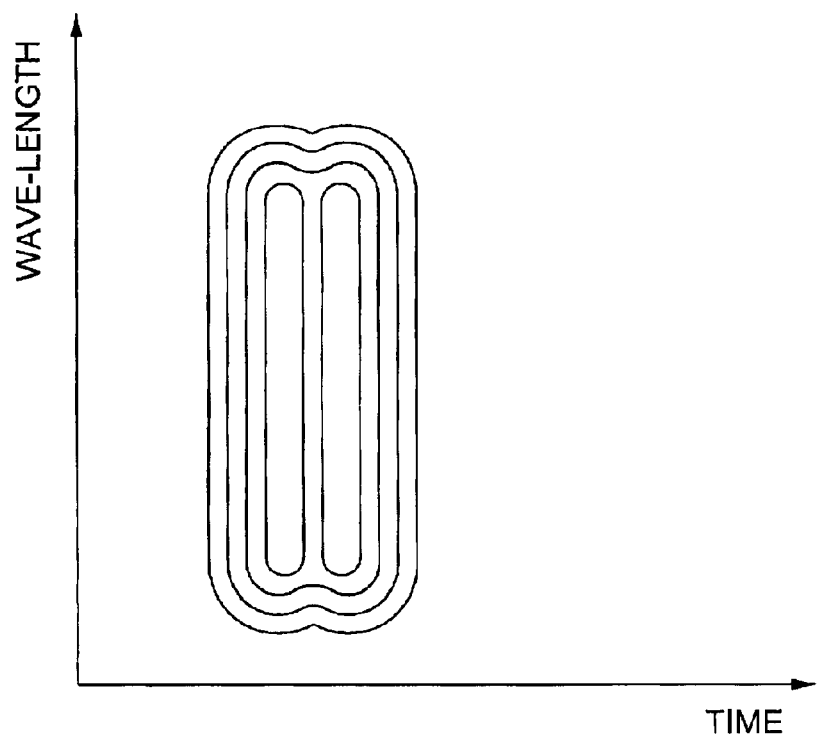
FIG. 6 is a plot corresponding to FIG. 3 but with data being chromatically corrected.

Iso-intensity contours for the corrected intensity data $I_{n,CORR}(t)$ are shown in FIG. 6. These contours show essentially no time skewing, and hence the majority of the intra-modal dispersion has been removed.

The corrected data may then be summed over all the wavelengths to create a chromatically corrected pulse waveform $$I_{CORR}(t) = \sum_n I_{n,CORR}(t) \quad (5)$$

The summing over wavelength improves the signal-to-noise ratio. Such a chromatically corrected pulse waveform 84 is illustrated in FIG. 4. Compared to the uncorrected pulse waveform 80, it is seen to have very sharp edges, which provide a precise measurement of the differential mode delay (inter-modal or temporal dispersion). The chromatically corrected pulse waveform 84 also correctly resolves DMD pulse splitting. In this case, the pulse appears to be dominated by two modal velocities, which are resolved. In the uncorrected pulse waveform 80, no mode splitting can be observed, and intra-modal dispersion has considerably distorted the pulse.

Further calculations may be performed based upon the chromatically corrected pulse. For example, the frequency response of a length of fiber can be obtained in the frequency domain by dividing the Fourier transform of the corrected pulse for the long production test fiber by the Fourier transform for a short reference fiber, preferably also chromatically corrected, $$R(\omega) = \frac{I_{CORR}(\omega)}{I_{REF}(\omega)}. \quad (6)$$

The normalized frequency response $R(\omega)$ removes the effect of the temporal width of the laser and any broadening arising from other components used in both the reference and production tests. The bandwidth of the fiber can be determined by finding the 3 db half-width $\omega_{3\ dB}$, for which $$|R(\omega_{3\ dB})| = 0.5, \quad (7)$$

which is the standard definition for the 3 dB bandwidth of a fiber.

Figure 7:
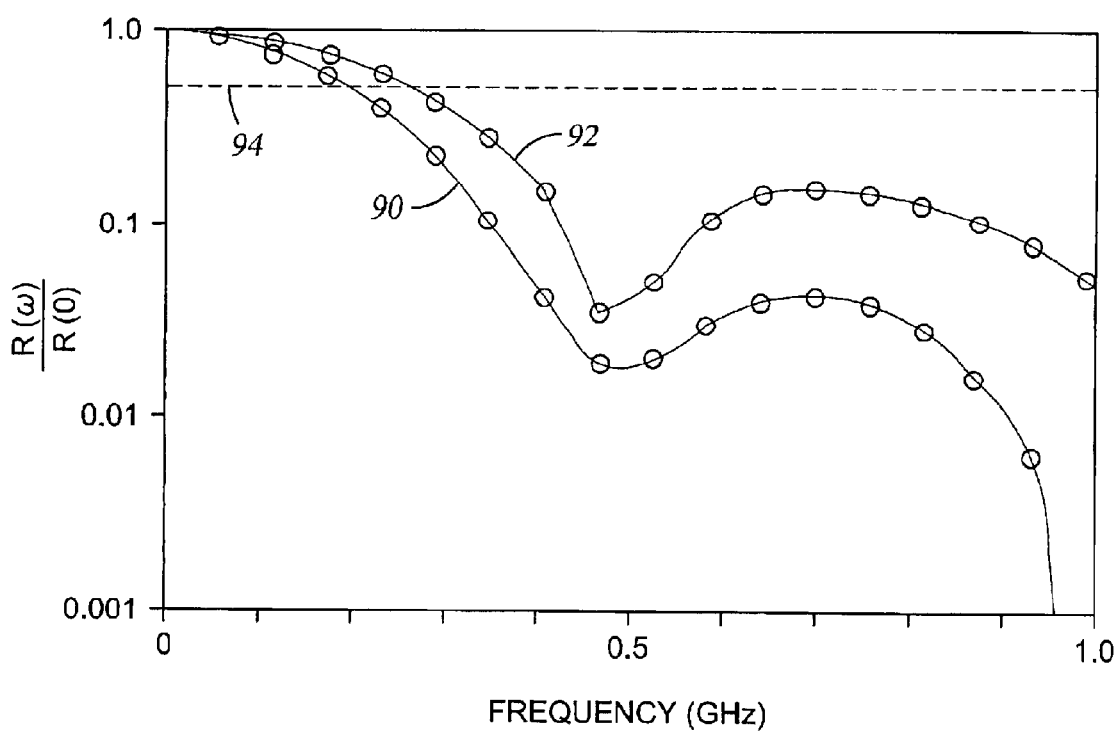
FIG. 7 illustrate the spectrum of impulse functions calculated according to the prior art and to the invention.

The importance of the chromatically corrected pulse in performing these further calculations is manifested by the graphs of the amplitudes of the lower-order Fourier transform components, plotted in FIG. 7. Line 90 shows the normalized amplitudes for an impulse response calculated from an uncorrected pulse, and line 92 shows the amplitudes from a chromatically corrected pulse. Bandwidth is often measured at the 3 dB power point for the impulse function $R(\omega)$, represented by horizontal line 94 at a normalized amplitude of 50%. Chromatic (intra-modal) correction allows the bandwidth measurement in fibers having higher bandwidth than is possible without the correction.

Experiments have shown that the bandwidth measured according to the invention with a laser diode source is sufficiently accurate to measure and verify 10 Gb/s capability in the fiber under test.

It is of course appreciated that the numerical analysis of the type described above greatly benefits from various additional well known techniques for removing quantization errors, background noise, highly localized signals, and the like in order to further improve measurement accuracy.

Various improvements in the method and apparatus of the invention are possible. For example, laser chirp can be measured and compensated. Laser chirp results from the effect that many pulsed lasers do not produce a pulse with a time-invariant spectrum. Instead, as schematically illustrated by the iso-intensity contours in FIG. 8 for a time and wavelength resolved pulse 100, the laser pulse has a narrow spectral width at any time, but the center wavelength changes with time. VCSELs are particularly prone to chirp.

Figure 8:
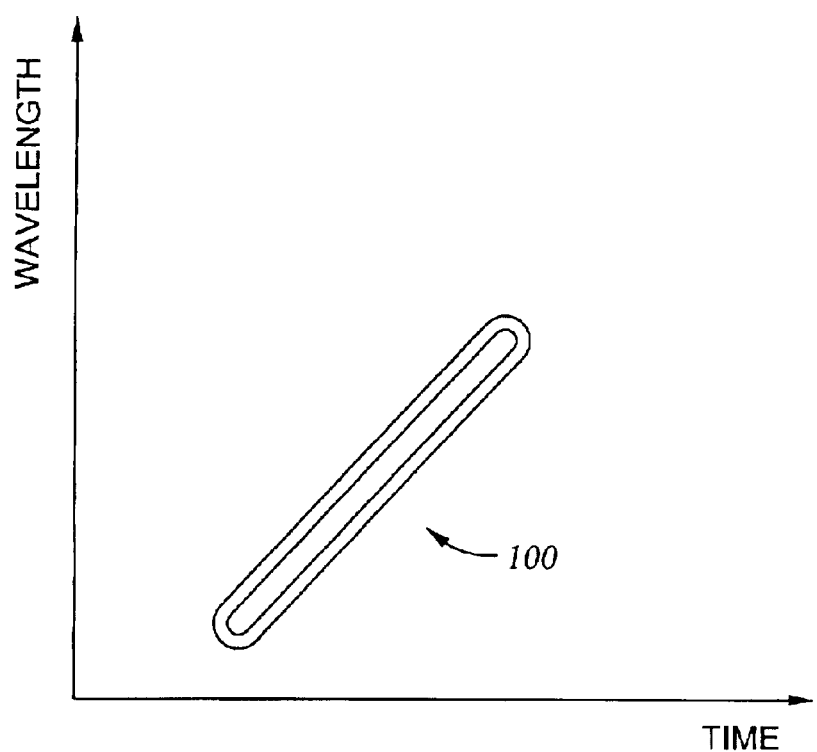
FIG. 8 is a plot of iso-intensity contours as a function of time and wavelength illustrating the output of a chirped laser source.
Figure 9:
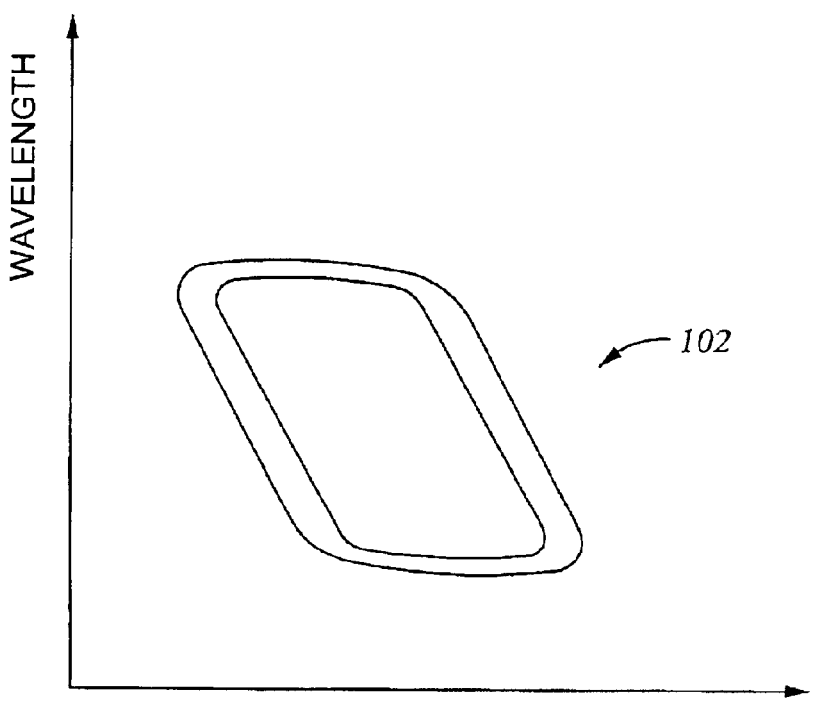
FIG. 9 is a plot of iso-intensity contours corresponding to the pulse of FIG. 8 after it has propagated along a multi-mode fiber.

In the illustration, the pulse wavelength increases over the pulse width. Chirp may produce a different and more complex pattern. The effect of chirp is similar to chromatic dispersion, but it occurs before the optical pulse enters the fiber under test. When such a chirped optical pulse traverses a long multi-mode fiber, the pulse is further subjected to intra-modal and inter-modal dispersion, as discussed above. The iso-intensity contours of FIG. 9 illustrate a chromatically and temporally dispersed output pulse 102 produced by a chirped input and observed at the end of the long fiber. As illustrated in FIGS. 8 and 9, the chirp and intra-modal dispersion may have opposite signs of variation of wavelength with time.

The invention can be applied to a situation of a chirped test laser in at least two ways.

In the first method, the laser source irradiates a short reference fiber. Using the method described above for the reference fiber, the fitted line 82 of FIG. 5 for the delays $\tau_m^{(ref)}$, which have the maximum cross-correlations on the reference fiber, has a slope representing the time vs. wavelength dependence of the chirp. Furthermore, the chromatic correction accounts for laser chirp. The test fiber is then measured in the same way, and it is also corrected. Both sets of chromatically corrected data are integrated over wavelength, and this removes the effect of chirp and chromatic dispersion from the measurement.

On the other hand, in the second method, the intra-modal dispersion on the test fiber is computed by determining the delays $\tau_{n,m}^{(ref)}$ and $\tau_{n,m}^{(fiber)}$ producing the largest cross-correlation at every wavelength window for both the short reference fiber and the long test fiber. The differences $$\tau_{n,m} = \tau_{n,m}^{(fiber)} - \tau_{n,m}^{(ref)} \qquad (8)$$

are plotted as in FIG. 5. A line 82 may be fit to the data produced according to Equation (8) to determine an intra-modal dispersion for the fiber alone.

Figure 2:
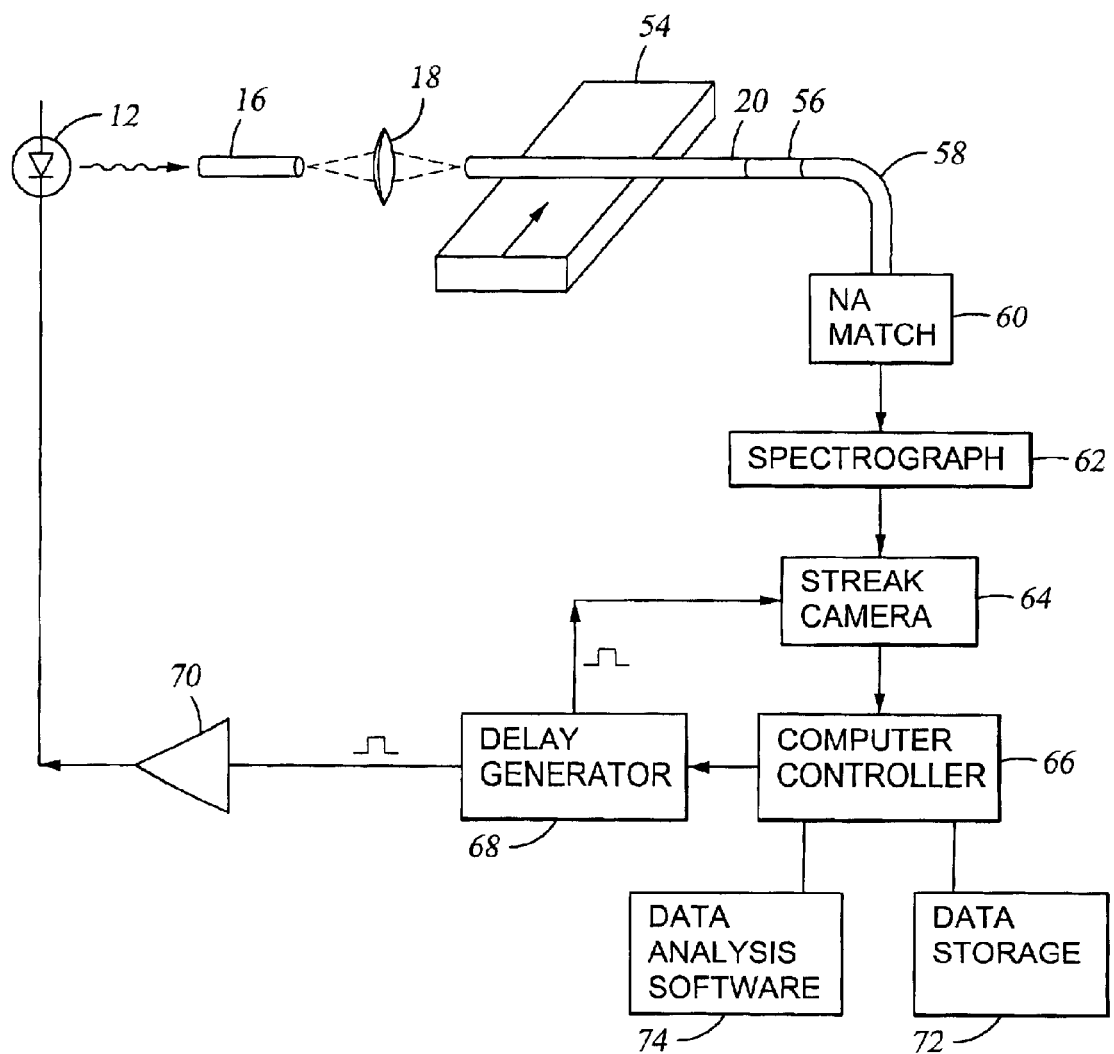
FIG. 2 is a schematic representation of the embodiment of FIG. 1 but incorporating more operational equipment.
Figure 10:
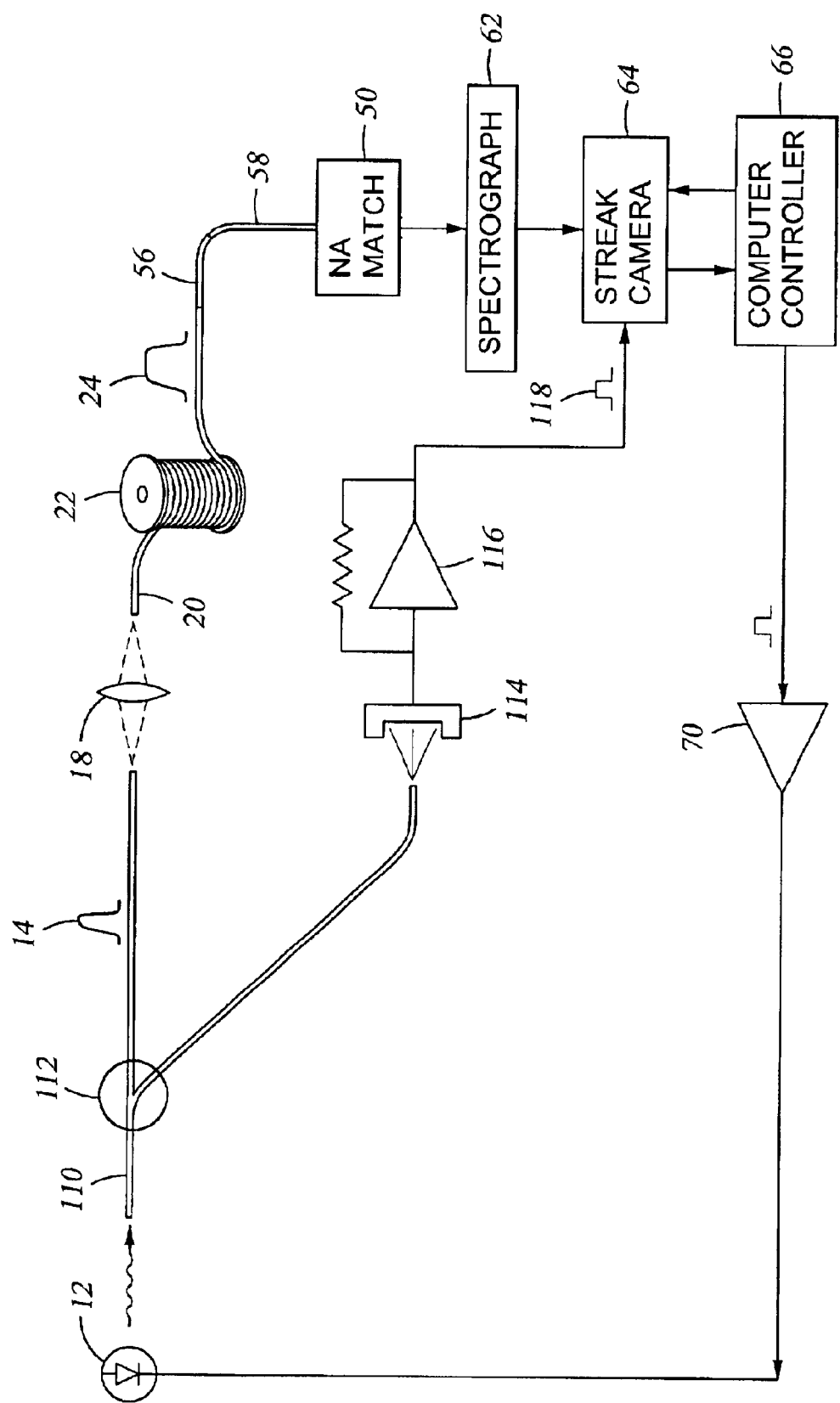
FIG. 10 is a schematic illustration of an improved triggering circuit.

An improvement in the triggering over that of the instrumentation of FIG. 2 is illustrated in the schematic diagram of FIG. 10. The computer controller 66 triggers the laser diode 12 through the drive circuit 70. No delay is required at this point of the triggering. A launch fiber 110 receiving the output of the laser diode 12 includes an optical splitter 112, which directs, for example, 90% of the pulse energy to the fiber under test 20 and 10% to an optical detector 114. The detected optical pulse is essentially the same one being propagated on the fiber under test 20. An amplifying and shaping circuit 116 receiving the output of the optical detector 114 produces an electrical pulse 118 which triggers the streak camera 64. Passive or active delay may be introduced in the electrical line between the optical detector 114 and the streak camera 64 or in the fiber between the splitter 112 and the optical detector 114 to synchronize the camera triggering with the arrival of the optical pulse 24 after it has been delayed on the test fiber 20. This arrangement reduces the jitter produced in pulsing the laser diode 12 and increases the measurable bandwidth.

Figure 11:
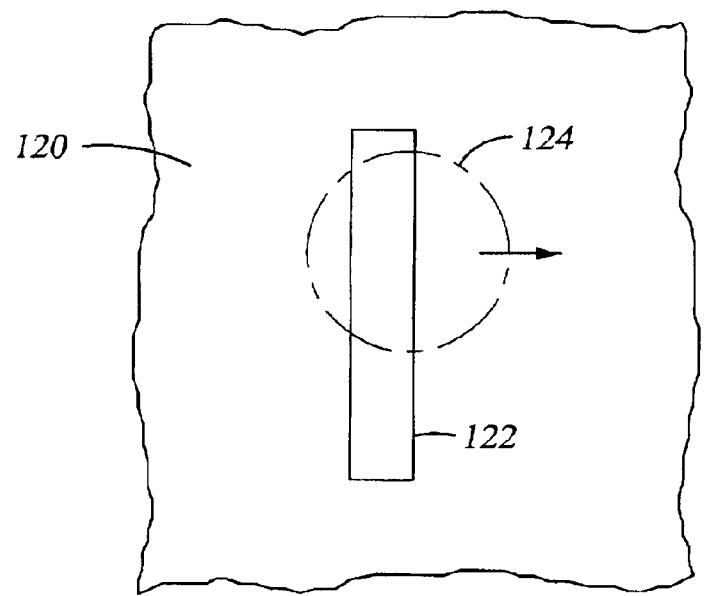
FIG. 11 is a schematic elevational view of a spectrometer entrance slit providing improved spectrographic resolution.

Another variation, schematically illustrated in FIG. 11, improves the spectral resolution by placing an entrance slit 120 at the input to the imaging spectrograph. The entrance slit 120 has a slit aperture 122 with a narrow width in the direction of the spectral separation of the spectrograph and a much longer length in the perpendicular direction. The slit width is selected to be less than the diameter of an image 124 of the fiber output incident on the entrance slit 120, for example, from the fiber 58 of FIG. 2. However, using an automatic stage, such as stage 54 of FIG. 2, the end of the fiber is scanned across the slit aperture 122 over the course of the measurement period, typically a few seconds, such that the entire diameter of the fiber image 124 moves completely across the slit width. Thereby, the spectroscopic resolution is determined by the width of the slit aperture 122 rather than the size of the fiber image 124.

Other forms of optical and electrical instrumentation may be substituted. For example, a scanning spectrometer such as a monochrometer may be substituted as the wavelength-dispersing element for the imaging spectrograph described above. Data acquisition for all wavelengths then requires multiple optical pulses, but the streak camera is simplified.

As described above, commercially available instrumentation may be used to enable the separate measurement of temporal and chromatic dispersion and to chromatically correct pulse profiles in a production environment.

Although the invention has been described with respect to measuring differential mode delay and bandwidth in a multi-mode fiber, the invention is not so limited. The invention can be used to measure chromatic effects and to chromatically correct other types of measurements of temporal broadening in optical systems. For example, polarization mode dispersion can be measured in a single-mode fiber probed by a laser pulse of finite spectral width. The invention can also be applied to the measurement of pulse waveforms on other transmission media.

What is claimed is:

1. A method of characterizing an optical fiber, comprising the steps of:
    (a) irradiating one end of a first optical fiber of a first length with an optical pulse;
    (b) wavelength dispersing an optical signal produced by said optical pulse after traversing said optical fiber;
    (c) recording temporal profiles for a plurality of wavelength components of said wavelength dispersed optical signal;
    (d) repeating steps (a), (b), and (c) for a second optical fiber of a second length substantially longer than said first length;
    (e) comparing said temporal profiles recorded from said first fiber to said temporal profiles recorded from said second fiber to determine a dispersion of said second fiber.

2. The method of claim 1, wherein said second fiber is a multi-mode fiber and said comparing step determines at least an inter-modal dispersion of said second fiber.

3. The method of claim 1, wherein said comparing step determines a chromatic dispersion of said second fiber.

4. The method of claim 1, wherein said first length is less than 10 m and said second length is greater than 1 km.

5. A method of characterizing an optical fiber, comprising the steps of:
    irradiating one end of an optical fiber with an optical pulse;
    wavelength dispersing an optical signal emitted at a second end of said optical fiber and produced by said optical pulse while traversing said optical fiber;
    recording temporal profiles for a plurality of wavelength components of said wavelength dispersed optical signal;
    comparing said plurality of temporal profiles to determine time offsets between said temporal profiles; and
    correcting said temporal profiles according to said offsets.

6. The method of claim 5, further comprising the step of combining said corrected temporal profiles to produce a combined corrected temporal profile with reduced dependence upon said wavelength.

7. The method of claim 6, further comprising Fourier transforming said combined corrected temporal profile.

8. The method of claim 7, further comprising comparing said Fourier transformed combined corrected temporal profile to a Fourier transformed temporal response obtained for a reference optical fiber.

9. The method of claim 5, wherein said comparing step includes calculating cross-correlation functions between a reference one of said temporal profiles and others of said temporal profiles.

10. The method of claim 5, wherein said irradiating, wavelength dispersing, and recording steps are repeated for a plurality of said optical pulses to produce said temporal profiles.

* * * * *